(12) United States Patent
Bækken et al.

(10) Patent No.: US 6,800,306 B1
(45) Date of Patent: Oct. 5, 2004

(54) GELLED FEED PRODUCTS, MEANS FOR MAKING THE PRODUCTS AND METHOD FOR MANUFACTURE OF SAID PRODUCTS

(75) Inventors: Øistein Bækken, Trondheim (NO); Olav Smidsrød, Trondheim (NO); Kurt Ingar Draget, Trondheim (NO); Freddy Johnsen, Rånåsfoss (NO)

(73) Assignee: Norsk Hydro Asa, Oslo (NO)

( * ) Notice: Subject to any disclaimer, the term of this patent is extended or adjusted under 35 U.S.C. 154(b) by 203 days.

(21) Appl. No.: 10/019,777

(22) PCT Filed: Jun. 28, 2000

(86) PCT No.: PCT/NO00/00227
§ 371 (c)(1),
(2), (4) Date: Apr. 4, 2002

(87) PCT Pub. No.: WO01/01792
PCT Pub. Date: Jan. 11, 2001

(30) Foreign Application Priority Data
Jul. 5, 1999 (NO) .............................................. 993314

(51) Int. Cl.⁷ ................................................. A23K 1/18
(52) U.S. Cl. ............................ 426/2; 426/573; 426/805
(58) Field of Search ............................. 426/2, 573, 805

(56) References Cited

U.S. PATENT DOCUMENTS

| 4,784,862 A | * 11/1988 | Wotherspoon ............... 426/103 |
| 4,935,250 A | * 6/1990 | Cox ............................. 426/94 |
| 5,783,241 A | 7/1998 | Bocabeille et al. ......... 426/276 |

FOREIGN PATENT DOCUMENTS

| JP | 62055059 | 8/1987 |
| JP | 63309166 | * 12/1988 |
| JP | 63309166 | 4/1989 |

OTHER PUBLICATIONS

Andrew, T.R., et al. "Application and control of the algin–calcium reaction", Food Product Development. 1970, pp. 99–104.

* cited by examiner

Primary Examiner—C. Sayala
(74) Attorney, Agent, or Firm—Wenderoth, Lind & Ponack, L.L.P.

(57) ABSTRACT

The present invention relates to gelled feed products, means for making said products and a method for manufacturing gelled feed products. The product comprises 80–98 weight % raw material of animal or marine origin pre-treated with KOH and/or NaOH, $KHCO_3$, $K_2CO_3$, $NaHCO_3$, $Na_2CO_3$, or $(NH_4)_2CO_3$ and 0.5–5 weight % alginate or pectin, a calcium source standard feed ingredients and calcium. The product may contain 0–10 weight % fish meal or carbohydrates. Said means are raw material of animal or marine origin pre-treated with alkali giving said raw material a pH of 8–12. The method comprises mixing raw materials of marine or animal origin, comprising offals, alginate or pectin, and a calcium source and standard feed ingredients, particulating said mixture into any useful geometrical shape, expose it to acid treatment in a bath. The raw material is pre-treated with alkali or to addition of alginate or pectin. The resulting mixture is formed into desired shape and treated in an acid bath to form the gelled product. Preferably the acid bath is having a pH of 0.5–5.5 and the retention time in the bath is 30 seconds–12 hours. The preferred acid is formic aid.

11 Claims, 3 Drawing Sheets

* With 15% feed meal

GELLED FEED PRODUCTS, MEANS FOR MAKING THE PRODUCTS AND METHOD FOR MANUFACTURE OF SAID PRODUCTS

This application is a 371 application of PCT/NO00/00227 filed Jun. 28, 2000.

The present invention relates to gelled feed products comprising raw material of animal or marine origin, including offals, 0.5–5 weight % alginate or pectin, a calcium source, standard feed ingredients such as proteins, lipids carbohydrates, vitamins, minerals, coloring agents etc. The invention further comprises a method for making said products and means for making the products.

The method comprises mixing raw materials of marine or animal origin, comprising offals, alginate or pectin and a calcium source and standard feed ingredients. Said mixture is particulated into any useful geometrical shape, whereupon it is exposed to acid treatment in a bath for performing gelling.

Gelled feed products are used in the fishfarming industry, but there have been several problems related both to the raw materials and the final product. The raw material has in practice been restricted to use of fresh or frozen fish and fish offals which have been minced before being mixed with the alginate. This means that preserved raw material has not been possible to use and thereby making the feed producer dependent on the availability of fresh raw material around the year, freezing capacity etc. Another problem relates to the pelletising step. The raw material contains a substantial amount of water and it has been necessary to add water binding agents In order to obtain pellets of required strength before they are introduced into the gelling bath. One way of solving this problem has been to add substantial quantities of meal, mainly wheat meal and fish meal. However, this will dilute the feed and thereby reduce the relative amounts of desired components like fat and protein and make the content of carbohydrates too high to be optimal for the fish. On top of these problems, the addition of such water binding agents increases the costs of the feed.

The gelled wet feed of today has another limitation, it has to be used within a couple of days, possibly one week, after production, dependent on the temperature. Consequently, the feed has only been produced by fish farmers for immediate use. Freezing of pellets has been tested and this works, however, it is expensive and severe problems have arisen during thawing of the pellets.

There are several gelled feed products and processes for these described in the literature. Thus WO95/28830 describes an ambient-temperature process for making a water stable aquatic animal feed including fish and crustaceans. Feed ingredients alginate and fresh water are mixed into a slurry containing 0.5–10% alginate. The slurry is then exposed to divalent cations to form a water stable alginate gel which subsequently is formed into feed pellets. Preferably a controlled amount of air or nitrogen is whipped into the slurry before the gelling step in order to impart a pre-selected specific density of the pellets which are formed by conventional means such as slicing, chopping, spraying or low-pressure extruding at ambient temperature. Though high temperature, mixing and extruding prior to gelling are avoided and thereby loss of vitamins etc., the total process will be expensive and the final pelletising step complicates the process.

It is further known from Norwegian Patent No. 95894 to mix the feed ingredients in water and add a water soluble alginate, a calcium salt and a retardant like phosphate such that a gel like continuous mass is made. The wet feed ingredients and alginate mix are extruded into strings being fed into a gelling bath containing calcium chloride which reacts with the alginate to form a gelled feed.

From Norwegian Patent Application No. 910390 it is known a similar method for making feed having regulated structure and density. The feed ingredients are mixed with alginate and calcium carbonate and when an acid is added to this mixture carbon dioxide is released at the same time as the mixture is gelled. The problem of pelletising/extruding the feed is solved by pelletising when the mixture is only partly gelled and then let the pellets mature for some time before being used in order to obtain sufficiently strong pellets. This way of avoiding that the gel strength of the pellets is destroyed during pelletisation is difficult to control and the final maturing step results in several production problems like reduced capacity, extra storage etc. before the pellets can be handled safely.

There is also known a commercial pelletised gelled wet feed called "Rubin Feed" described in http:/www.rubin.no, a brochure from Stiftelsen Rubin, Pirsenteret, 7005 Trondheim, Norway, published August 1997. This feed comprises about 70% fish offals, about 10% fish oil, about 5% seaweed meal containing alginate, about 10% wheat meal, about 5% fish meal and minor amounts of vitamins, minerals, calcium carbonate and coloring agent. This feed is made from fresh fish/fish offals or frozen fish/fish offals. The dry ingredients are mixed and pelletised, whereupon the pellets are transported through a gelling bath containing weak formic acid. The feed can be stored for a few days. One disadvantage of this feed is that it is necessary to add wheat and fish meal (15%) in order to obtain required texture prior to pelletisation and gelling. Further, the raw materials are restricted to fresh/frozen fish/fish offals. Preserved fish can not be used.

The main object of the invention was to overcome the problems related to use of preserved raw material or fish silage and to reduce the need for water binding agents like carbohydrates and fish meal without reducing the texture of the feed product or pellet.

Another object was to preserve the end product to be able to store the feed pellets for at least 2–3 weeks.

A further object was to delete or reduce the amount of alginate in the product without reducing its gel strength.

It was also an object to obtain products having a high oil content which could be stored for a prolonged time without leaking out oil.

Finally, it was an object to obtain a raw material having reduced and acceptable level with respect to bacteria, virus, fungi and parasites and still be useful for producing a gelled product.

In order to solve the various problems stated above, the inventors started studying ways of treating the raw material in ways that would not prevent or reduce the effect of adding alginate and obtain at least the same consistency of the intermediate product during pelletisation and then gel the mixture to pellets having a firm texture and consistency and being substantially water-insoluble and free flowing. The preservative agent should also be compatible with the end use of the product. Preservation with acids like formic acid proved to give substantial problems during subsequent process steps. Previous attempts to produce pellets directly from minced fish by-products have failed. It proved difficult to achieve pellets with required texture by gelling techniques only since addition of alginate followed by gelling did not increase neither the viscosity nor the final texture sufficiently.

Addition of a water holding or absorbing agent such as extruded wheat and/or fish meal has therefore been considered necessary to facilitate pellet production with traditional pelletisers. It was therefore tried to simply increase the pH instead of decreasing the pH of the raw material and observe the effect on addition of alkali. Initial tests were then performed adding KOH to minced fish by-products.

This addition of KOH was surprisingly found to give the raw material a firmer texture and as the pH increased it seemed to increase the water holding capacity of the raw material to such an extent that there would hardly be any need for the conventional water binding agents. The feed mixture without feed meal could be pelletised without any need for gelling taking place in the mixer. In addition two beneficial effects were obtained in connection to the alginate behaviour. The alginate dissolved better at higher pH, and the alginate consumption due to gelling in the mixer was reduced since the Ca+ content was reduced. The amount of alginate available for the subsequent gelling process was therefore reduced. This gelling in an acid bath could then be performed resulting in pellets with improved consistency and being non-sticky and free flowing. Starting the gelling from a higher pH level gave a more effective gelling process. Based on the results and observations during the initial tests, more systematic experiments utilizing the concept for treating the raw material were started.

The raw materials to be treated within the concept comprise first of all fish offals and whole fish which usually are minced. Type of fish is not critical, this can be various types of cod fish, herring, capelin etc. Animal meat and animal offals can also be processed according to the invention when such raw materials are applicable as for instance in pet feed.

Useful additives for increasing the pH comprise KOH, NaOH, $KHCO_3$, $K_2CO_3$, $NaHCO_3$, $Na_2O_3$, $(NH_4)_2CO_3$ and mixtures of these. Urea may also be added to the raw material in order to improve the preservative properties of the product It was found that raw material could be preserved for several months by bringing the pH to as much as pH 12. The preservation time will depend on the type of raw material and the pH chosen. Additional preserving components such as antioxidants, are applicable for improvement of the preservation.

The alginate component comprises any of several derivatives of alginic acid. Alginate is a family of unbranched binary copolymers of (1, 4) linked b-D-mannurinic acid (M) and α-L-guluronic acid (G) residues of widely varying composition and sequence. The term alginate used herein comprises any purification level, from technical grade alginate containing low amounts of alginate all the way through ultra purified grades, of a polymer with the chemical composition outlined above. The term alginate also comprises any natural occurring polymer, both from brown seaweeds and from bacterial origin, and enzymatically modified alginate.

It has also been found that pectin can be an applicable gelling agent.

The gelled product according to the invention can have any useful geometrical shape. Thus, the product can for instance be in the form of particles, pellets, strings and even large plates.

The scope of the invention and special features are as stated in the claims.

The gelled feed product according to the invention contains 80–98 weight % of fish or animal raw material pre-treated with KOH and/or NaOH, $KHCO_3$, $K_2CO_3$, $NaHCO_3$, $Na_2CO_3$ or $(NH_4)_2CO_3$ and may contain 0–10 weight % fish meal or carbohydrates.

A special product is in the form of pellets with a diameter of 15 mm and has a gel strength of 100–400, measured as force in grams to compress the pellets 2 mm by a 25 mm cylinder.

The invention also comprises means for making the gelled product comprising raw materials of animal or marine origin, including offals, pre-treated with KOH and/or NaOH, $KHCO_3$, $K_2CO_3$, $NaHCO_3$, $Na_2CO_3$ or $(NH_4)_2CO_3$ in amounts sufficient for giving said raw material a pH of 8–12.

The special features of the method according to the invention are that there is applied raw materials pre-treated with KOH and/or NaOH, $KHCO_3$, $K_2CO_3$, $NaHCO_3$, $Na_2CO_3$ or $(NH_4)_2CO_3$ prior to addition of alginate or pectin, whereupon the resulting mixture is formed into desired shape and then treated in an acid bath to form the gelled product.

The applied acid bath can have a pH of 0.5–5.5.

The gelling in the bath can be performed for 30 seconds to 12 hours.

There can be applied an acid bath containing formic acid and/or mineral acids.

The calcium source can be added to the acid bath, preferably as $CaCl_2$.

The invention will be further explained and elucidated in the following examples and figures.

EXAMPLE 1

Minced herring was mixed thoroughly with KOH in amounts necessary to bring the pH of the mixture up to pH 10. Then a seaweed meal containing about 20% alginate, in amounts corresponding to 5 weight % in the final feed were also mixed with the raw materials. Feed ingredients like colour agents, vitamins, etc. were also mixed with the raw material at this stage and worked into the feed mixture until they all were well distributed and the alginate was dissolved. The mixture was then fed to a pelletiser and the formed feed strings were fed into a bath containing 4% formic acid. The pH of the acid bath was 2.0 and this started the gelling of the pellet. The extent of gelling was found to depend on the retention time in the bath and the pH. Already at a retention time of about a minute, strong pellets with a firm consistency were made. A parallel test was run on the same mixture except that no KOH was added prior to pelletisation. In this case the strings/pellets from the pelletiser had a much softer consistency, proper pellets were not formed, and the gelled product was also less firm than the product made with addition of KOH.

EXAMPLE 2

Figure 1:
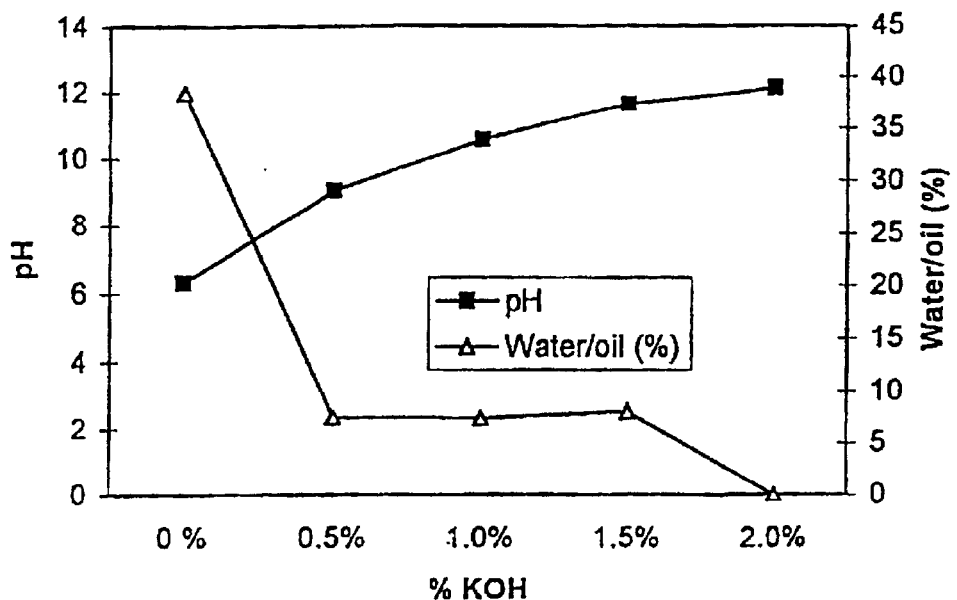
FIG. 1 shows water binding in raw material as function of added KOH.

This example shows the water binding effect of adding KOH to the raw material. The weighed fish, with and without addition of KOH was centrifuged at 23430G for 20 minutes at 20° C. and subsequent to centrifugation the removed liquid, consisting of oil plus water, was recorded as % of the original weight of the raw material. The results of these experiments are shown in Table I and FIG. 1.

TABLE I

| Test | pH | Water + Oil % |
|---|---|---|
| Without KOH | 6.29 | 38.52 |
| 0.5% KOH | 9.06 | 7.62 |
| 1.0% KOH | 10.58 | 7.48 |
| 1.5% KOH | 11.63 | 8.09 |
| 2.0% KOH | 12.12 | 0 |

Addition of KOH proved to bind the water such that removed liquid dropped significantly already at an addition of 0.5% KOH. It was further observed that when KOH was added to the raw material the removed liquid contained only oil. When 2.0% KOH was added also the oil seemed to be bound as no liquid was removed during the centrifugation. Similar results were found when the raw material was treated with NaOH. The water binding effect of applying KOH or NaOH on the fish raw material can be utilized to pelletise the product ingredients into pellets with desired texture and firmness without being based on any gelling in the mixer. This improved water and oil binding property following KOH addition seems to result from water migration into the protein structure giving an increased viscosity and thus stabilizing the oil droplets. This result points towards the possibility of adding more oil to the feed without subsequent leakage.

EXAMPLE 3

This example shows the variation in gel strength of the feed pellets as function of added alginate. The gelling was performed in 5% formic acid over night.

| The gel strength was measured in the following way: | |
|---|---|
| Instrument: | TA-XT2 Texture analyzer |
| Probe: | P/25A (25 mm aluminium cylinder with a flat surface) |
| Test speed: | 0.1 mm/sec. |
| Distance: | 2 mm compression. |
| The pellet's diameter was: | 15 mm |

Figure 2:
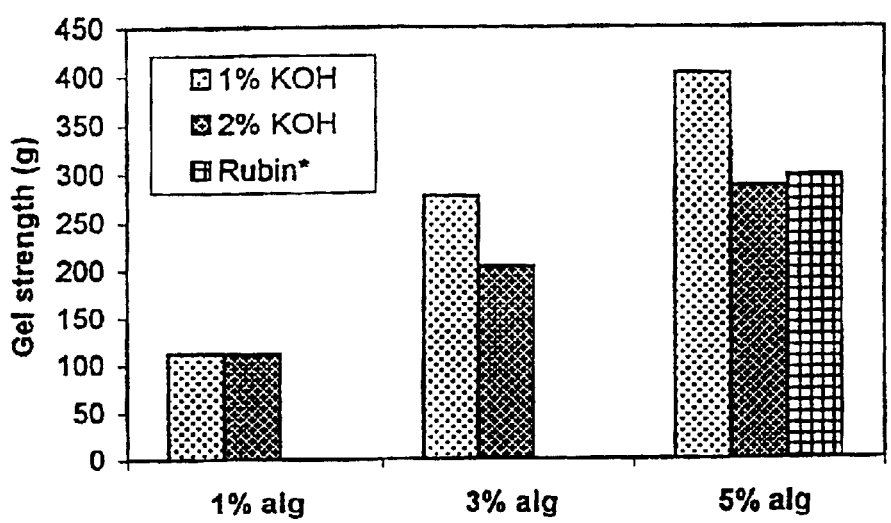
FIG. 2 shows gel strength of pellets as function of added alginate.

The results are shown in Table II and FIG. 2. In the figure the amount of alginate is stated as % alginate, in the form of sea weed meal containing about 20% alginate. Thus 5% alginate in the table corresponds to about 1% pure alginate. The gel strength is expressed as force in grams to obtain 2 mm compression of the pellet Pellets according to the invention are compared with pellets of the commercial "Rubin feed" containing 5% seaweed and 15% feed meal. To this latter feed no KOH was added, while the other new feed had been treated with 1%, respectively 2% KOH instead of adding feed meal.

TABLE II

| Sample | % Alginate | pH pellet mixture | Gel strength | % KOH |
|---|---|---|---|---|
| 1 | 1 | 10.11 | 111.7 | 1 |
| 2 | 3 | 9.86 | 276.4 | 1 |
| 3 | 5 | 9.69 | 401.8 | 1 |
| 4 | 1 | 11.86 | 111 | 2 |
| 5 | 3 | 11.51 | 203.4 | 2 |
| 6 | 5 | 11.3 | 287.6 | 2 |

TABLE II-continued

| Sample | % Alginate | pH pellet mixture | Gel strength | % KOH |
|---|---|---|---|---|
| Rubin Feed | 5 | 6.38 | 297.58 | 0* |
| Rubin Feed | 5 | ** | ** | 0** |

*"Rubin Feed" contained 15% water binding meal.
**"Rubin Feed" without water binding meal. It was not possible to measure the gel strength because the mechanical property of the pellet was too poor.

From this experiment it can be seen that the amount of alginate can be reduced substantially compared to the known "Rubin Feed" without reducing the gel strength if the raw material has been treated with KOH.

EXAMPLE 4

This example shows the effect of pH/acid concentration in the gelling bath on the gel strength of the pellets. The raw material had been treated with 2% KOH and the gelling time was 2 minutes pH was measured on the surface of the pellets 24 hours after gelling. The gel strength was measured as stated in Example 3. The results of these experiments are shown in Table III and FIG. 3.

TABLE III

| Sample | Acid strength | pH pellet surface | Gel strength |
|---|---|---|---|
| 1 | 1.1 MHCl | 10.5 | 168.5 |
| 2 | 10% HCOOH | 10.5 | 193.0 |
| 3 | 15% HCOOH | 10.6 | 218.7 |
| 4 | 20% HCOOH | 8.3 | 241.8 |
| 5 | 30% HCOOH | 6.3 | 359 |
| 6 | 50% HCOOH | 5.1 | 400.6 |
| 7 | 0.3 M Ca Cl2 | 11.7 | * |

*It was not possible to measure the gel strength because the mechanical property of the pellet was too poor.

Figure 3:
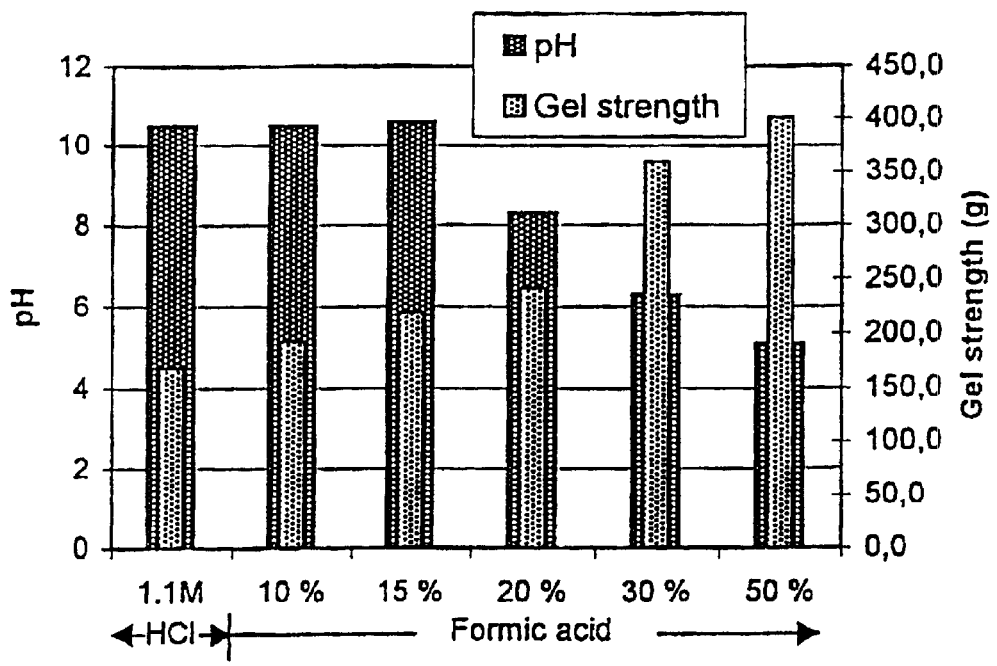
FIG. 3 shows gel strength of pellets as function of pH and acid concentration of gelling bath.

From Table III and FIG. 3 it can be seen that the gel strength increases substantially when the pH on the pellet surface decreases. Table III further shows that the ph of the gelling bath can be lowered to a very low value (down to zero) and still give stable and good results.

EXAMPLE 5

Figure 4:
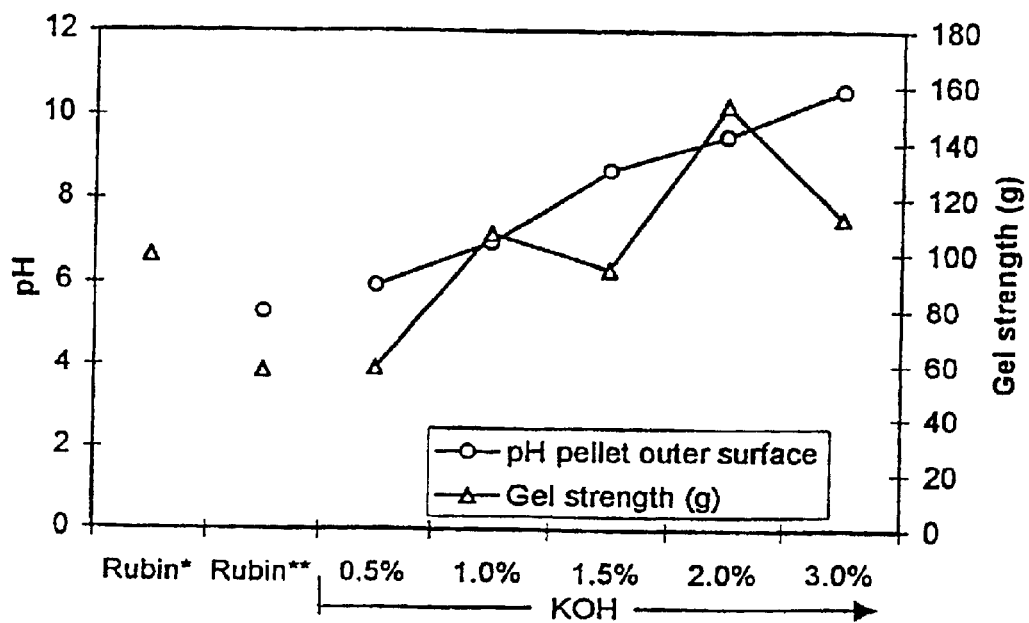
FIG. 4 shows gel strength of pellets as function of alginate concentration and KOH added.

This example shows the effect of added KOH to the fish raw material on the gel strength and the pH of the pellets. The results of these experiments are shown in Table IV and FIG. 4.

TABLE IV

| Sample | % KOH | pH pellet mix. | pH pellet inner core | pH surface | Gel strength |
|---|---|---|---|---|---|
| Rubin* | 0 | 6.46 | | | 99.3 |
| Rubin** | 0 | 6.55 | 5.57 | 5.28 | 57.8 |
| 3 | 0.5% | 8.08 | 6.46 | 5.93 | 58.7 |
| 4 | 1.0% | 9.62 | 7.68 | 6.93 | 107.2 |
| 5 | 1.5% | 10.35 | 8.49 | 8.69 | 94.4 |
| 6 | 2.0% | 11.07 | 9.97 | 9.51 | 153.4 |
| 7 | 3.0% | 12.24 | 11.17 | 10.56 | 113.3 |

*With 15% water binding meal
**Without any water binding meal

From these experiments it can be seen that the gel strength will increase with increasing ph of the raw material. Further, it is obvious that for the "Rubin Feed" the gel strength drops markedly when there is no feed meal present.

EXAMPLE 6

Figure 5:
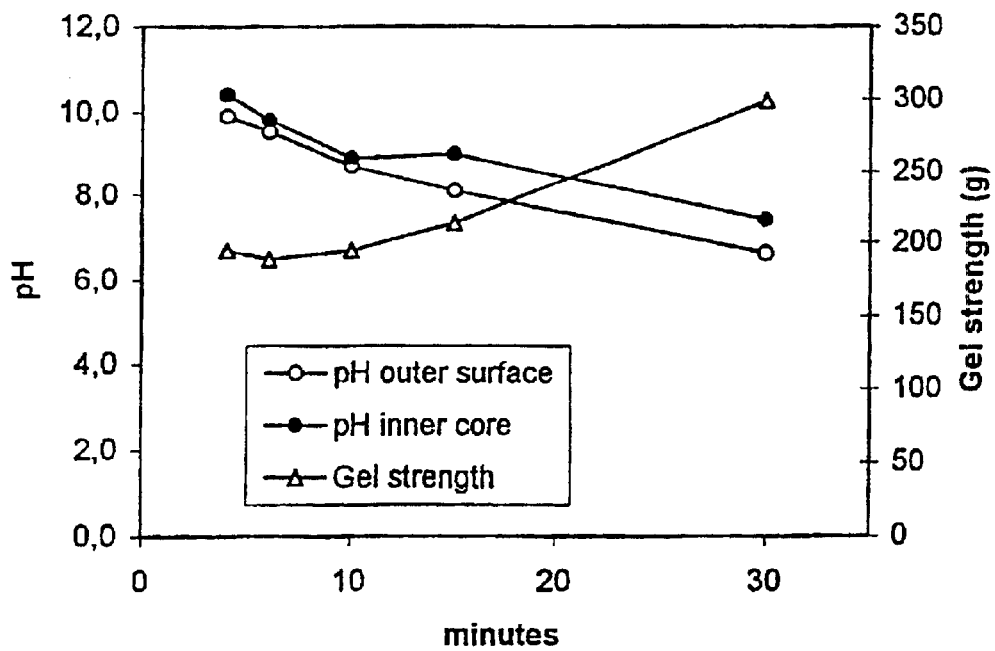
FIG. 5 shows gel strength of pellets as function of gelling time in 5% formic acid.

This example shows the effect of gelling time on the gelling strength of the pellets. The experiments were performed on mixtures being treated with 2% KOH and the pH in the gelling bath was 2.0. The results of these experiments are shown in Table V FIG. 5.

TABLE V

| Sample | Gelling time (min) | pH surface | pH inner core | Gel strength |
|---|---|---|---|---|
| 1 | 4 | 9.9 | 10.4 | 194.5 |
| 2 | 6 | 9.5 | 9.8 | 188.8 |
| 3 | 10 | 8.7 | 8.9 | 194.8 |
| 4 | 15 | 8.1 | 9.0 | 213.3 |
| 5 | 30 | 6.6 | 7.4 | 299.1 |

These experiments show that the gel strength increases substantially when the gelling time is raised.

EXAMPLE 7

This example shows the effect of adding an alkali when the raw material is minced animal meat and/or animal offals. Minced hearts of cattle, but without any water binding meal, was mixed with alginate, 1%, respectively 2% KOH was added. This mixture could be stored for a prolonged time or be introduced directly into a gelling bath containing calcium ions and formic acid. This experiment showed that addition of KOH resulted in binding of water in the same way as for fish raw material. Visual observation of the gelling process showed similar effect as for fish raw material, resulting in non-sticking and non-soluble pellets. However, this specific type of raw material has a firmer initial texture than fish and also than other animal by-products. Accordingly, the gel strength was difficult to measure by the measuring method used in the above examples.

This type of animal feed is especially useful for pet food for cats, dogs etc.

Figure 6:
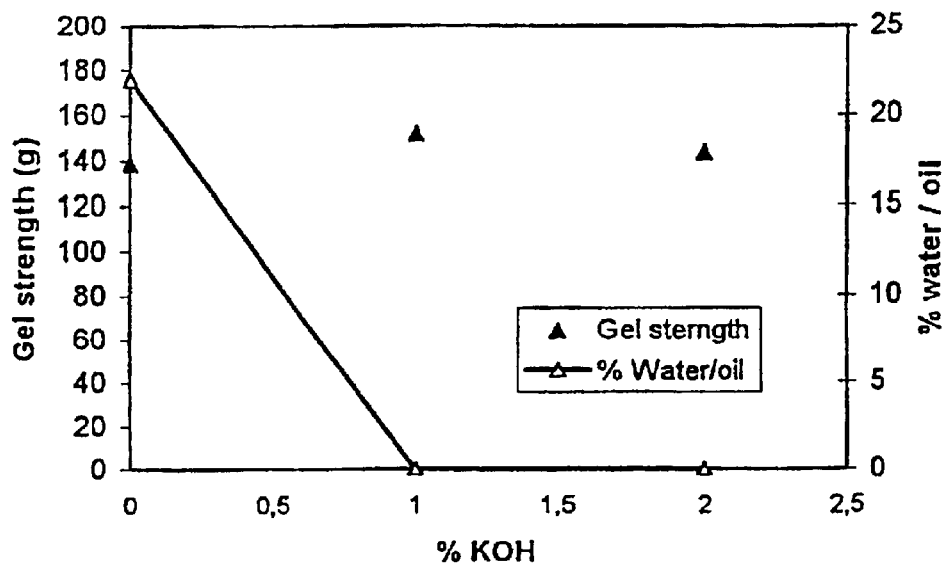
FIG. 6 shows water binding in minced cattle hearts as function of % KOH.

Gel strength stated in the table as force in grams was measured for 2 mm compression in the same way as stated in Example 3. The results of this experiment are shown in Table VI and FIG. 6.

TABLE V

| Sample | Gel strength | pH | % KOH | Water + oil % |
|---|---|---|---|---|
| 1 | 138.5 | 5.87 | 0 | 22 |
| 2 | 151.5 | 10.98 | 1 | 0 |
| 3 | 142.9 | 12.56 | 2 | 0 |

By the present invention the inventors have succeeded in solving major problems related to different frequently used raw materials for gelled feed. Pellets having desired texture and gel strength have been obtained without diluting the product with water binding components like wheat or fish meal, as being done in the "Rubin Feed". The new product can also be made with a lower amount of alginate than usually without reducing the gel strength. Both the product and the intermediate means comprising raw material treated with alkali, can be stored for a prolonged time. Thus treated raw material was accordingly suitable for raw material for gelled products. The treatment also had a disinfective effect with respect to bacteria, virus, fungi and parasites. Accordingly, compared to any conventional known wet feed, major problems with these feeds, which have prevented them from being used in any large scale in industrial salmon fish farming, are solved by the invention.

What is claimed is:

1. A gelled feed product comprising raw materials of animal or marine origin, 0.5–5 weight % alginate or pectin, a calcium source, and standard feed ingredients,
   wherein the product contains 80–98 weight % fish or animal raw material pre-treated with at least one member selected from the group consisting of KOH, NaOH, $KHCO_3$, $K_2CO_3$, $Na_2HCO_3$, $Na_2CO_3$ and $(NH_4)_2CO_3$.

2. The gelled feed product according to claim 1, wherein the product contains 0–10 weight % fish meal or carbohydrates.

3. The gelled feed product according to claim 1, wherein the product is pellets with a diameter of 15 mm and has a gel strength of 100–400, measured as force in grams to compress the pellets 2 mm by a 25 mm cylinder.

4. The gelled feed product according to claim 1, wherein the standard feed ingredients are selected from the group consisting of proteins, lipids, carbohydrates, vitamins, minerals, and coloring agents.

5. The gelled feed product according to claim 1, wherein the raw materials of animal or marine origin comprise offals.

6. A method for manufacturing gelled feed products comprising mixing raw materials of marine or animal origin, alginate or pectin, a calcium source, and standard feed ingredients, particulating said mixture into any useful geometrical shape, and exposing the particulated mixture to acid treatment in a bath for performing gelling,
   wherein the raw materials are pre-treated with at least one member selected from the group consisting of KOH, NaOH, $KHCO_3$, $K_2CO_3$, $NaHCO_3$, $Na_2CO_3$, or and $(NH_4)_2CO_3$ prior to addition of adding the alginate or pectin.

7. The method according to claim 6, wherein the acid bath has a pH of 0.5–5.5.

8. The method according to claim 6, wherein the gelling in the acid bath is performed for 30 seconds to 12 hours.

9. The method according to claim 6, wherein the acid bath contains formic acid.

10. The method according to claim 6, wherein the calcium source is $CaCl_2$.

11. The method according to claim 6, wherein the raw materials of animal or marine origin comprise offals.

* * * * *